No. 685,852. Patented Nov. 5, 1901.
C. W. KRAGH.
MOTOR STARTING AND CONTROLLING DEVICE.
(Application filed Apr. 9, 1900.)
(No Model.) 2 Sheets—Sheet 1.
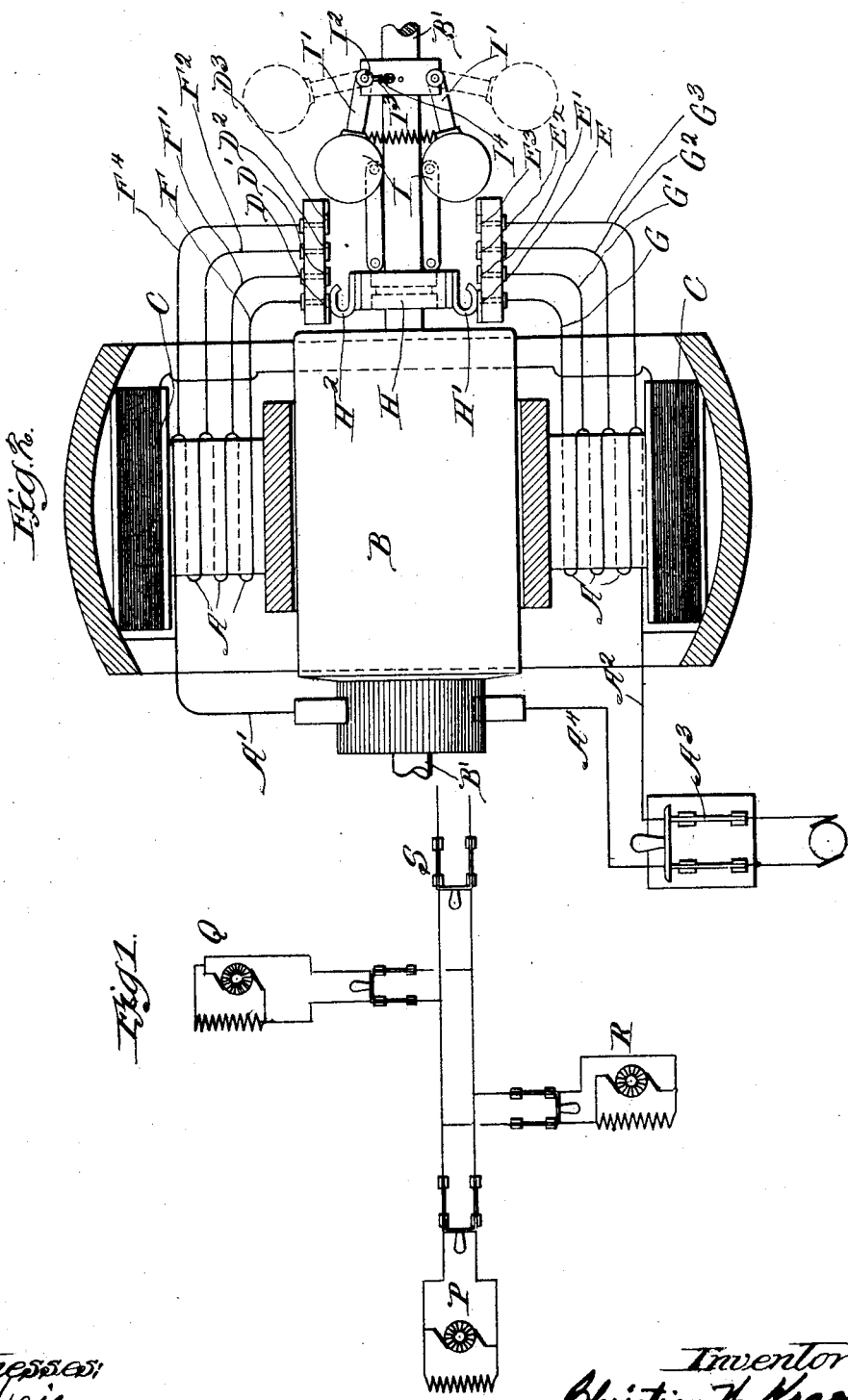

No. 685,852. Patented Nov. 5, 1901.
C. W. KRAGH.
MOTOR STARTING AND CONTROLLING DEVICE.
(Application filed Apr. 9, 1900.)
(No Model.) 2 Sheets—Sheet 2.
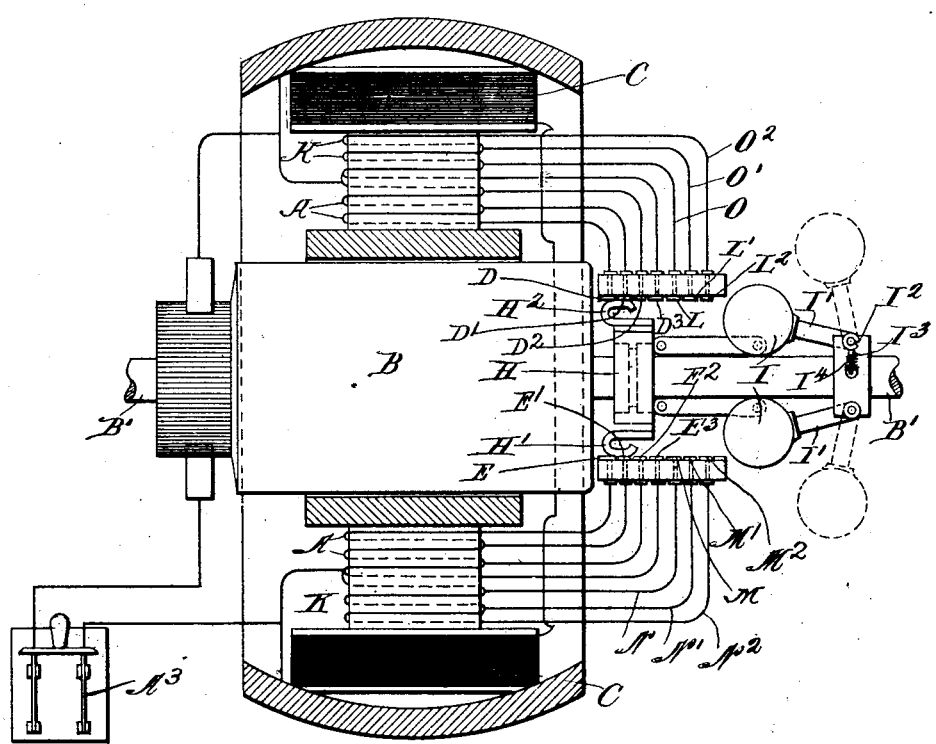
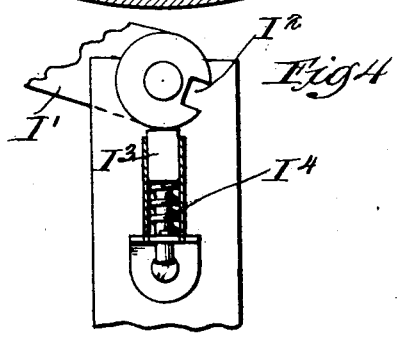

UNITED STATES PATENT OFFICE.

CHRISTIAN W. KRAGH, OF MADISON, WISCONSIN, ASSIGNOR TO THE NORTHERN ELECTRICAL MANUFACTURING COMPANY, OF MADISON, WISCONSIN, A CORPORATION OF WISCONSIN.

MOTOR STARTING AND CONTROLLING DEVICE.

SPECIFICATION forming part of Letters Patent No. 685,852, dated November 5, 1901.

Application filed April 9, 1900. Serial No. 12,133. (No model.)

*To all whom it may concern:*

Be it known that I, CHRISTIAN W. KRAGH, a citizen of the United States, residing at Madison, in the county of Dane and State of Wisconsin, have invented a certain new and useful Improvement in Motor Starting and Controlling Devices, of which the following is a specification.

My invention relates to starting devices for motors, and has for its object to provide a new and improved device for this purpose.

My invention is illustrated in the accompanying drawings, wherein—

Figure 1 is a diagrammatic view showing a series of motors embodying my invention and connected in circuit. Fig. 2 is a view, in part diagrammatic, showing one manner of applying the starting device to the individual motor. Fig. 3 is a view similar to Fig. 2, showing a modified construction. Fig. 4 is a detail view showing the locking device for holding the starting device in its inoperative position.

Like letters refer to like parts throughout the several figures.

With the devices ordinarily used in connection with continuous-current motors each motor must be started up independently, the operator going around to the various motors when it is desired to start them up. With my starting device I have arranged so that when a series of motors are connected in circuit, as shown in Fig. 1, all of said motors may be automatically started at one time from a single point and by the movement of a single switch, it being unnecessary to give the individual motors any attention. The starting device associated with the individual motors also automatically and independently protects each motor, so as to cut it out or otherwise control it to prevent injury under abnormal conditions.

Referring now to Fig. 2, I have shown in a diagrammatic manner one form of my starting device applied to a given form of motor. In this construction I provide a suitable resistance A in series with the armature B of the motor. This resistance may be composed of resistance-coils or may be of any other form and may be located in any desired place.

As herein illustrated, the resistance consists of the resistance-coils A, shown as wound around the field-magnets C of the motor, said coils being wound in such a direction as to aid or reinforce the shunt-windings of the field-magnets when the current is flowing through said coils. The resistance-coils A are connected at one end with the armature by the conductor A' and at the other end with the main circuit by the conductor $A^2$, there being a suitable switch $A^3$ provided in the main circuit and there being a suitable conductor $A^4$ leading from the armature to said switch. A series of contacts D D' $D^2$, &c., and E E' $E^2$, &c., are mounted upon suitable supports in proximity to the shaft B' and are connected to the resistance-coil by suitable conductors F F' $F^2$, &c., and G G' $G^2$, &c., so as to divide the resistance-coil into sections. A movable contact device H is located on the shaft B' and is provided with brushes H' $H^2$, which connect the opposed contacts of the sets D and E when in a predetermined position. An automatic controlling device is connected with this movable contact device, so as to automatically vary its position, thus varying the resistance in the armature-circuit. As herein shown, this automatic controlling device consists of the governor-balls I, suitably mounted upon the shaft B' and connected with the movable contact device. Said contact device, as shown in Fig. 2, is normally placed so as to connect the contacts D and E, and thus complete the circuit through the motor-armature when the switch in the main line is closed. If for any reason the speed of the armature of a given motor increases abnormally, the starting device automatically breaks the circuit through the armature and keeps the circuit broken until the attendant can correct the difficulty. This result may be obtained in any desired manner, and, as herein shown, the automatic controlling device is provided with a suitable means for locking it at one of its extreme positions. As herein illustrated, I have provided one of the arms I', carrying the governor-balls, with the notch or cut-away portion $I^2$. A suitable engaging device $I^3$ is located in proximity thereto and is preferably pressed forward by a suitable spring I⁴. The parts are so arranged that when the speed of the armature becomes abnormal the governor-balls will have moved to such a position as to move the contact device past the outer contacts D³ E³ and break the circuit. When a sufficient movement to break the circuit takes place, the engaging device I³ comes opposite the notch I² and the spring presses it into said notch, so as to lock the automatic controlling device in a position to keep the circuit broken. It will be seen that the individual motor is thus protected and will not be again placed in circuit until the attendant remedies the evil and unlocks the automatic controlling device.

Referring now to Fig. 3, I have shown a modified construction wherein the starting device is also used to obtain a substantially constant speed of the motor when the load is varied. In this construction the resistance-coils A are used and are connected up in the same manner as shown in Fig. 2, and an additional set of resistance-coils K is wound upon the field-magnets of the motor and is wound so as to oppose the ordinary field shunt-windings. A series of additional contacts L L' L², &c., and M M' M², &c., are placed in proximity to the contact device H, said contacts being connected to the coil K by the conductors N N' N², &c., and O O' O², &c. These additional contacts are arranged so that when the speed of the motor-armature rises above a predetermined rate the sections of the resistance-coil K will be cut into the circuit and will tend to decrease the speed of the armature in two ways—first, by opposing the shunt field-coils, and, second, by interposing a resistance in the armature-circuit. It will thus be seen that when the load is varied so as to tend to increase the speed of the motor the controlling device automatically prevents this.

Referring now to Fig. 1, I have shown a series of motors P Q R connected with the main circuit, said circuit being controlled by the switch S.

I have shown in detail and in a diagrammatic manner one construction embodying my invention; but it is of course evident that the construction may be varied in many particulars without departing from the spirit of my invention, and I therefore do not limit myself to the construction illustrated.

The use and operation of my invention are as follows: When the construction shown in Fig. 2 is used, the parts are normally in position to complete the circuit through the motor when the main line is open and the motor is not running. If now the switch A³, for example, is closed, the circuit through the motor will be completed and will be traced as follows: from switch A³ through conductor A⁴ to the armature, thence by conductor A' to the coil A. The current divides at this point, part going through the shunt-coils and back to the main line, the other part going through resistance-coils A, conductor F, contact D, contact device H, contact E, conductor G, resistance-coils A, and conductor A² back to the main line. The motor now starts up with the full resistance in the armature-circuit. The current flowing through the resistance-coils A supplements or aids the shunt-windings, so as to aid in starting the motor. As the motor acquires speed, so as to develop electromotive force, the governor-balls spread out and move the contact device H so as to disconnect the contacts D and E and connect contacts D' and E'. A portion of the resistance, as will be seen, is now cut out, and as the speed continues the contact device H is moved farther until it cuts out the desired amount of resistance, when normal speed is attained. If now the motor becomes overloaded, so as to slow down the armature to the danger-point, the governor-balls move inwardly and move the contact device H so as to cut in more resistance in the armature-circuit, and thus prevent injury. If for any reason the armature stops, the contact device moves back to its initial position, so as to cut in all of the resistance, and thus prevent injury to the armature. If now the shunt-windings should become broken or the circuit crossed with a circuit of higher voltage or if for any other reason the armature should attain an abnormally high speed, the governor-balls are thrown out, so as to move the contact device to a point where the circuit through the armature is broken, and the balls are then locked in this position by the engaging device I³ entering the notch I² in the arm I' of one of the governor-balls. The motor will thus be stopped and injury prevented. If, for example, a number of motors are connected in circuit, as shown in Fig. 1, it will be seen that when each is provided with my starting device all of said motors can be controlled from a given point—as, for example, by means of the switch S in the main line. If said switch is closed, all of said motors will automatically start up and will be automatically controlled and each will be independently thrown out of circuit when the speed becomes abnormal and each will be independently and automatically controlled, so as to obviate injury under abnormal conditions.

Referring now to Fig. 3, wherein I have shown a construction for automatically obtaining constant speeds for variable loads and at the same time for automatically protecting the motor, it will be seen that the device operates the same as the device in Fig. 2 under normal conditions. When the speed is normal, the contact device will connect the contacts D³ and E³. If now the load is constantly decreased and the motor tends to speed up, the governor-balls will fly out farther and connect a portion of the coil K in circuit with the armature. This coil K then tends to retard the armature by two agencies—first, by decreasing the strength of the shunt-windings, and, second, by adding additional resistance to the armature-circuit. If the speed increases, the governor-balls fly out farther and insert greater resistance, thus tending to bring the motor back to normal speed. If for any reason, as the breaking of the shunt-windings, the speed becomes abnormal and dangerous, the governor-balls fly out so as to break the circuit and are locked in this position.

It will thus be seen that I have here a device which when applied to the individual motors automatically controls the motor when it is overloaded so as to protect it, protects the motor when there is an injury or accident to the main line, and automatically throws the motor out of circuit and holds it out of circuit when the shunt-circuit is broken or is decreased in strength below a predetermined amount. In addition to these features I also obtain features which cannot be obtained by the ordinary starting device now in use. These features are as follows: First, I can start a number of motors from a given point by a single operation of closing a switch, and these motors will each be independently and automatically controlled so as to prevent injury from any abnormal conditions; second, in case the line gets crossed with a circuit of higher voltage, thus causing the armature to attain an abnormal or dangerous speed, this device automatically breaks the circuit and holds the parts in this position until the evil can be remedied; third, any abnormal high speed of the armature brought about by any condition will result in automatically breaking the circuit and the protection of the motor; fourth, I also provide additional torque on the starting of the motor, and, fifth, I am also enabled to produce a substantially constant speed when the load is varied. These results are all obtained by means of a compact, simple, and self-contained construction, which may be attached directly to the motor, so as to form part thereof.

I claim—

1. The combination with an electric motor of a starting device, comprising a suitable resistance divided up into sections, a contact device adapted to be moved so as to vary the amount of resistance in the circuit, an automatic controlling device connected with said contact device and responsive to variations in the speed of the armature, said automatic controlling device adapted to move the contact device so as to break the circuit when the speed becomes abnormal, and a locking device associated with said automatic controlling device and adapted to lock it when the parts are moved to a predetermined position.

2. The combination with an electric motor of a variable resistance in circuit with the armature, a controlling device responsive to the speed of the armature and adapted to vary said resistance in a predetermined manner, and a locking device associated with said controlling device and adapted to lock it in an inoperative position when the parts reach a predetermined relative position.

3. The combination with a motor of a variable-resistance coil wound upon the field-magnets of the motor, so as to reinforce said field-magnets, said coil divided into a series of sections, a contact device adapted to be moved so as to vary the number of sections in circuit, an automatic controlling device responsive to the speed of the armature and connected with said contact device so as to move it, the contact device normally closing the circuit through the armature when the parts are stationary, but adapted to be moved so as to break the circuit under predetermined abnormal conditions, and a locking device actuated when the parts are moved to break the circuit and adapted to engage same so as to hold them in said latter position.

4. The combination with an electric motor of a controlling device, comprising two sets of variable-resistance coils wound upon the field-magnets, one wound to strengthen the field-magnets and the other to weaken said field-magnets, an automatic controlling device responsive to the speed of the armature and connected with said variable-resistance coils and adapted to control the resistance in the circuit as the load varies, so as to produce a substantially constant speed with a variable load.

5. The combination with an electric motor of a controlling device, comprising two sets of variable-resistance coils, wound upon the field-magnets, one wound to strengthen the field-magnets and the other to weaken said field-magnets, an automatic controlling device, which cuts both sets of coils out when the speed is normal, said controlling device responsive to the speed of the armature and adapted to cut in one set of coils when the speed is reduced and cut in the other set of coils when the speed is increased.

6. The combination with an electric motor of a controlling device, comprising two sets of variable-resistance coils wound upon the field-magnets, one wound to strengthen the field-magnets and the other to weaken said field-magnets, an automatic controlling device, which cuts both sets of coils out when the speed is normal, said controlling device responsive to the speed of the armature and adapted to cut in one set of coils when the speed is reduced and cut in the other set of coils when the speed is increased, a maximum position for said controlling device at which the circuit through the armature is broken, and a locking device for automatically locking the parts in said maximum position.

CHRISTIAN W. KRAGH.

Witnesses:
AUGUST J. BUENZLI,
FRANK L. STAGG.